US012597145B2

(12) United States Patent
Lu et al.

(10) Patent No.: US 12,597,145 B2
(45) Date of Patent: Apr. 7, 2026

(54) MEASURING METHOD AND SYSTEM FOR BODY-SHAPED DATA

(71) Applicant: INDUSTRIAL TECHNOLOGY RESEARCH INSTITUTE, Hsinchu (TW)

(72) Inventors: Yu-Chi Lu, Taoyuan City (TW); Po Hsuan Hsiao, Caotun Township (TW); Ming-Yen Chen, Pingtung City (TW); Chang Hong Lin, Zhudong Township (TW); Hsin-Yeh Yang, Taichung City (TW); Cheng-Hsuan Cheng, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 506 days.

(21) Appl. No.: 18/080,847

(22) Filed: Dec. 14, 2022

(65) Prior Publication Data

US 2024/0202931 A1 Jun. 20, 2024

(51) Int. Cl.
*G06T 7/149* (2017.01)
*G06T 7/62* (2017.01)
*G06V 10/44* (2022.01)

(52) U.S. Cl.
CPC ............... *G06T 7/149* (2017.01); *G06T 7/62* (2017.01); *G06V 10/44* (2022.01); *G06T 2207/30196* (2013.01)

(58) Field of Classification Search
CPC . G06T 7/149; G06T 7/62; G06T 2207/30196; G06T 7/60; G06T 7/12;
(Continued)

(56) References Cited

U.S. PATENT DOCUMENTS 8,842,906 B2 9/2014 Watson et al.
9,317,755 B2 * 4/2016 Kataoka ............... G06V 10/421
(Continued)

FOREIGN PATENT DOCUMENTS

CN 1987879 A 6/2007
CN 101322589 B 6/2010
(Continued)

OTHER PUBLICATIONS

Taiwanese Office Action and Search Report for corresponding Taiwanese Application No. 112100242, dated May 30, 2023.
(Continued)

*Primary Examiner* — Oneal R Mistry
*Assistant Examiner* — Justin Philip Cascais
(74) *Attorney, Agent, or Firm* — Birch, Stewart, Kolasch & Birch, LLP

(57) ABSTRACT

A measuring method and system for body-shaped data are provided. The measuring method comprises: performing a feature extraction on an apparel image to obtain a plurality of apparel feature points by a feature positioning module; performing a contour extraction on the apparel image to obtain an apparel boundary by an image segmentation module; calculating at least one shift value of the apparel feature points relative to the apparel boundary based on the apparel feature points and the apparel boundary by a processing module; correcting at least one of the apparel feature points according to the at least one shift value by the processing module, and projecting the corrected at least one of the apparel feature points to a three-dimensional model and obtaining at least one body-shaped data according to the apparel feature points on the three-dimensional model by the processing module.

18 Claims, 6 Drawing Sheets

(58) Field of Classification Search
CPC ........... G06T 17/00; G06T 2207/20081; G06T
2207/20084; G06V 10/44
See application file for complete search history.

(56) References Cited

U.S. PATENT DOCUMENTS

| | | | |
|---|---|---|---|
| 9,727,787 B2 | 8/2017 | Wilf et al. | |
| 10,321,728 B1 | 6/2019 | Koh et al. | |
| 11,854,146 B1 * | 12/2023 | Smith | G06V 20/647 |
| 2002/0172407 A1 * | 11/2002 | O'Donnell | G06T 7/12 |
| | | | 382/154 |
| 2004/0024315 A1 * | 2/2004 | Chalana | A61B 8/0858 |
| | | | 600/443 |
| 2013/0121577 A1 * | 5/2013 | Wang | G06V 10/764 |
| | | | 382/173 |
| 2014/0300907 A1 | 10/2014 | Kimmel | |
| 2017/0353711 A1 | 12/2017 | Wayenberg | |
| 2018/0137640 A1 | 5/2018 | Farahbakhshian et al. | |
| 2020/0158628 A1 | 5/2020 | Chen et al. | |
| 2022/0044056 A1 | 2/2022 | Liu et al. | |
| 2022/0188897 A1 | 6/2022 | Szeli et al. | |
| 2022/0198747 A1 | 6/2022 | Savaroche | |
| 2023/0047211 A1 * | 2/2023 | Abuelwafa | G06T 7/64 |
| 2023/0096013 A1 * | 3/2023 | Agrawal | G06T 7/62 |
| | | | 345/423 |
| 2024/0029347 A1 * | 1/2024 | Seyrek Pierre | G06V 10/25 |

FOREIGN PATENT DOCUMENTS

| | | | | | |
|---|---|---|---|---|---|
| CN | 109766464 A | 5/2019 | | | |
| CN | 110245575 A | 9/2019 | | | |
| CN | 110672014 A | * | 1/2020 | | G01B 11/02 |
| CN | 111881804 A | 11/2020 | | | |
| CN | 112541961 A | 3/2021 | | | |
| TW | 201508551 A | 3/2015 | | | |
| TW | 201838787 A | 11/2018 | | | |

OTHER PUBLICATIONS

Huang et al., "Clothing Landmark Detection Using Deep Networks With Prior of Key Point Associations," IEEE Transactions on Cybernetics, vol. 49, No. 10, 2019, pp. 3744-3754.

Lee et al., "A Global-Local Embedding Module for Fashion Landmark Detection," Proceedings of the IEEE/CVF International Conference on Computer Vision (ICCV), 2019, 4 pages total.

Liu et al., "Deep Fashion Analysis with Feature Map Upsampling and Landmark-driven Attention," Computer Vision—ECCV 2018 Workshops, 2019, 7 pages total.

Luetzenburg et al., "Evaluation of the Apple iphone 12 Pro LiDAR for an Application in Geosciences," Scientific Reports, vol. 11, 2021, pp. 1-9.

Vogt et al., "Comparison of iPad Pro®'s LIDAR and TrueDepth Capabilities with an Industrial 3D Scanning Solution," Technologies, vol. 9, 2021, pp. 1-13, 14 pages total.

Wang et al., "Attentive Fashion Grammar Network for Fashion Landmark Detection and Clothing Category Classification," Proceedings of the IEEE Conference on Computer Vision and Pattern Recognition (CVPR), 2018, pp. 4271-4280.

* cited by examiner

MEASURING METHOD AND SYSTEM FOR BODY-SHAPED DATA

BACKGROUND OF THE INVENTION

Field of the Invention

The present invention relates in general to a measuring method and system for body-shaped data.

Background of the Invention

There is a need of making the measuring technology of body-shaped data easier for general consumers to use at home. Thus, the skilled in this field strive to achieve the real-time detection of the user's body-shaped data so as to make the user quickly obtain the body-shaped data by taking pictures at home through general consumer electronic products.

SUMMARY OF THE INVENTION

The present invention relates to a measuring method and system for body-shaped data. By extracting a plurality of apparel feature points and an apparel boundary from an apparel image, performing a shift correction on the apparel feature points relative to the apparel boundary, and then projecting the corrected apparel feature points to the three-dimensional model to obtain at least one body-shaped data based on the apparel feature points in the three-dimensional model, so that a relevant body shape measurement results may be obtained according to the apparel image.

According to a first aspect of the present invention, a measuring method for body-shaped data is provided. The measuring method for body-shaped data comprises: performing an feature extraction on an apparel image to obtain a plurality of apparel feature points by a feature positioning module; performing an contour extraction on the apparel image to obtain an apparel boundary by an image segmentation module; calculating at least one shift value of the apparel feature points relative to the apparel boundary based on the apparel feature points and the apparel boundary by a processing module; correcting at least one of the apparel feature points according to the at least one shift value by the processing module; and projecting the corrected at least one of the apparel feature points to a three-dimensional model and obtaining at least one body-shaped data according to the apparel feature points on the three-dimensional model by the processing module.

According to a second aspect of the present invention, a measuring system for body-shaped data is provided. The measuring system for body-shaped data comprises a feature positioning module, an image segmentation module and a processing module. The feature positioning module is configured to perform a feature extraction on an apparel image to obtain a plurality of apparel feature points. The image segmentation module is configured to perform a contour extraction on the apparel image to obtain an apparel boundary. A processing module is configured to calculate at least one shift value of the apparel feature points relative to the apparel boundary based on the apparel feature points and the apparel boundary, correct at least one of the apparel feature points according to the at least one shift value, and project the corrected at least one of the apparel feature points to a three-dimensional model and obtain at least one body-shaped data according to the apparel feature points on the three-dimensional model.

The disclosure of the present invention will become apparent from the following detailed description of the preferred but non-limiting embodiments. The following description is made with reference to the accompanying drawings.

DETAILED DESCRIPTION OF THE INVENTION

Figure 1:
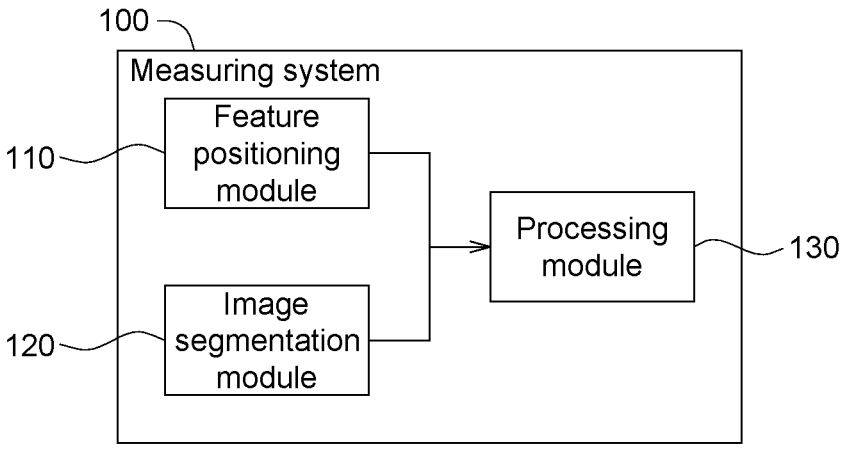
FIG. 1 is a block diagram of a measuring system for body-shaped data according to an embodiment of the present invention.

The embodiments of the present invention will be described in detail below, together with the drawings as examples. In addition to these detailed descriptions, the present invention may also be widely implemented in other embodiments, and any simple replacement, modification and equivalent change of the described embodiment(s) are included in the scope of the present invention.

In the following detailed description, for purpose of explanation, numerous details are set forth in order to provide a thorough understanding of the disclosed embodiments. However, the present invention may be practiced under omitting some or all of these details. Also, well-known steps and elements are not described in detail in order to avoid unnecessarily limitation to the present invention. The same or similar elements in the drawings have the same or similar reference signs. It should be noted that the drawings are for illustrative purpose only and do not mean the actual size or quantity of elements, unless otherwise described.

Please refer to FIG. 1, which shows a block diagram of a measuring system 100 for body-shaped data according to an embodiment. For example, the measuring system 100 is a personal computer, a notebook computer, a smart tablet device, a smart mobile device or other suitable devices. The measuring system 100 comprises a feature positioning module 110, an image segmentation module 120 and a processing module 130. For example, the feature positioning module 110 is a module for using the positioning technology of feature point, and the feature positioning module 110 may be configured to perform a feature extraction on an apparel image to obtain a plurality of apparel feature points. In an embodiment, the positioning technology of feature point is Landmark, Landmark may be trained based on an apparel data set, and the apparel data set is DeepFashion2 for example. In detail, the feature positioning module 110 may detect apparel boundary in the apparel image to output a plurality of apparel feature points. In an embodiment, the feature positioning module 110 may identify 62 different kinds of data of apparel feature point. In an embodiment, the apparel image processed by the feature positioning module 110 is a two-dimensional image. For example, the image segmentation module 120 is a module for processing apparel images, which may be configured to perform a contour extraction on the apparel image to obtain an apparel boundary. In an embodiment, the image segmentation module 120 may use the technology of Mask R-CNN (Mask Region-based Convolutional Neural Network) to train the image matting, and then uses it for contour extraction. In another embodiment, the image segmentation module 120 may use a trained model for the contour extraction. In detail, the image segmentation module 120 may segment a boundary of the apparel in the apparel image to output a background removal result and then obtain the apparel boundary according to the background removal result. In an embodiment, the apparel image processed by the image segmentation module 120 is a two-dimensional image.

The apparel image is obtained by using a camera or a video camera to capture. In an embodiment, the camera or the video camera is a visible-light camera or a visible-light video camera for example, and the apparel image is a two-dimensional image captured by a visible-light camera or a visible-light video camera correspondingly, such as a color image of RGB (red, green and blue) or CMYK (cyan, magenta, yellow and black). The apparel image may be input to the feature positioning module 1110 and/or the image segmentation module 120 to output results such as the apparel feature points and/or the apparel boundary. In an embodiment, the apparel image may be an image showing that a garment is not worn on a human body. For example, a garment may be laid flat or hung and then photographed to obtain a pure apparel image. No user need to wear a garment and be photographed, so that users may be prevented from being photographed and information security of privacy may be guaranteed. However, the present invention is not limited thereto. In an embodiment, the apparel image is an image showing that a garment worn on a human body. In an embodiment, the apparel image is an image showing that a garment worn on a mannequin.

The processing module 130, the feature positioning module 110 and/or the image segmentation module 120 may be a CPU (central processing unit), a microcontroller, a microprocessor, a processor, a digital signal processor, ASICs (application specific integrated circuits), a digital logic circuit, a field programmable logic gate array and/or other hardware components and/or software with the computing and/or processing function. In an embodiment, the measuring system 100 may include a processor unit to execute the function, process and/or method of the processing module 130, the feature positioning module 110 and/or the image segmentation module 120. In an embodiment, the processor unit may be a central processing unit, a microcontroller, a microprocessor, a processor, a digital signal processor, ASICs, a digital logic circuit, a field programmable logic gate array, and/or other hardware components with the computing and/or processing function. Since there may be a deviation of the apparel feature points from the actual apparel boundary in the apparel image, a correction is performed to make the subsequent body shape measurement calculated by using the apparel feature points more accurate. Therefore, the processing module 130 is configured to calculate a shift value of the apparel feature point data relative to the apparel boundary data based on the obtained apparel feature points and apparel boundary, and then correct the apparel feature points according to the shift value.

During the process of measuring the body shape calculated by using the apparel feature points, the processing module 130 is configured to project the corrected feature points of the apparel to the three-dimensional model, and obtain at least one body-shaped data according to the apparel feature points projected to the three-dimensional model. In an embodiment, the three-dimensional model is a three-dimensional mesh model for example. The three-dimensional mesh model may be obtained from the detection by a depth sensor for example. The depth sensor is able to scan and detect a human body wearing a garment and then get a three-dimensional mesh model, or scan and detect a pure garment and then get a three-dimensional mesh model. For example, the processing module 130 may project coordinates of the apparel feature points of the two-dimensional apparel image to a space of the three-dimensional mesh model by using Raycast technology, and then obtain the body-shaped data according to the projected apparel feature points.

Figure 2:
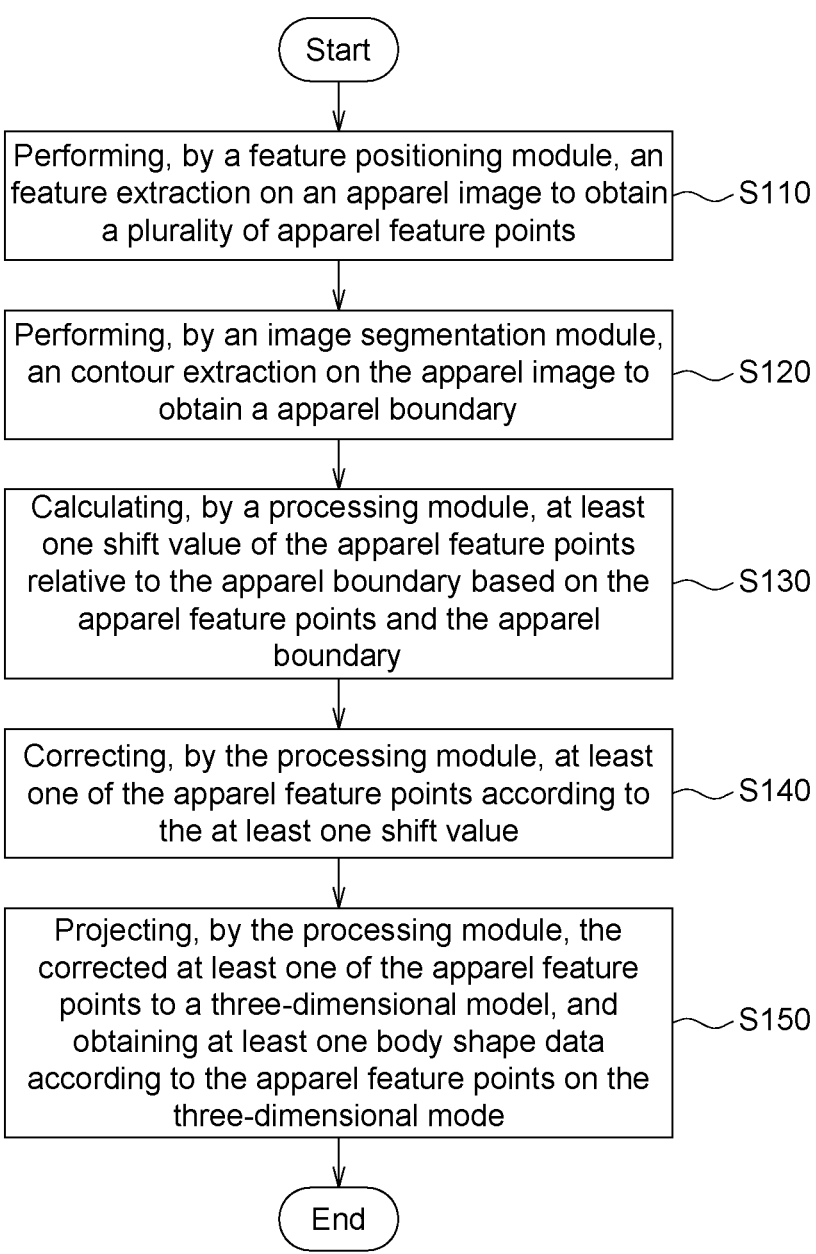
FIG. 2 is a flow chart of a measuring method for body-shaped data according to an embodiment of the present invention.

Please refer to FIG. 2, which shows a flow chart of a measuring method for body-shaped data according to an embodiment. In this embodiment, the measuring system 100 for body-shaped data shown in FIG. 1 is configured to perform the following measuring method for body-shaped data. Steps of the measuring method are described as follows.

Figure 3:
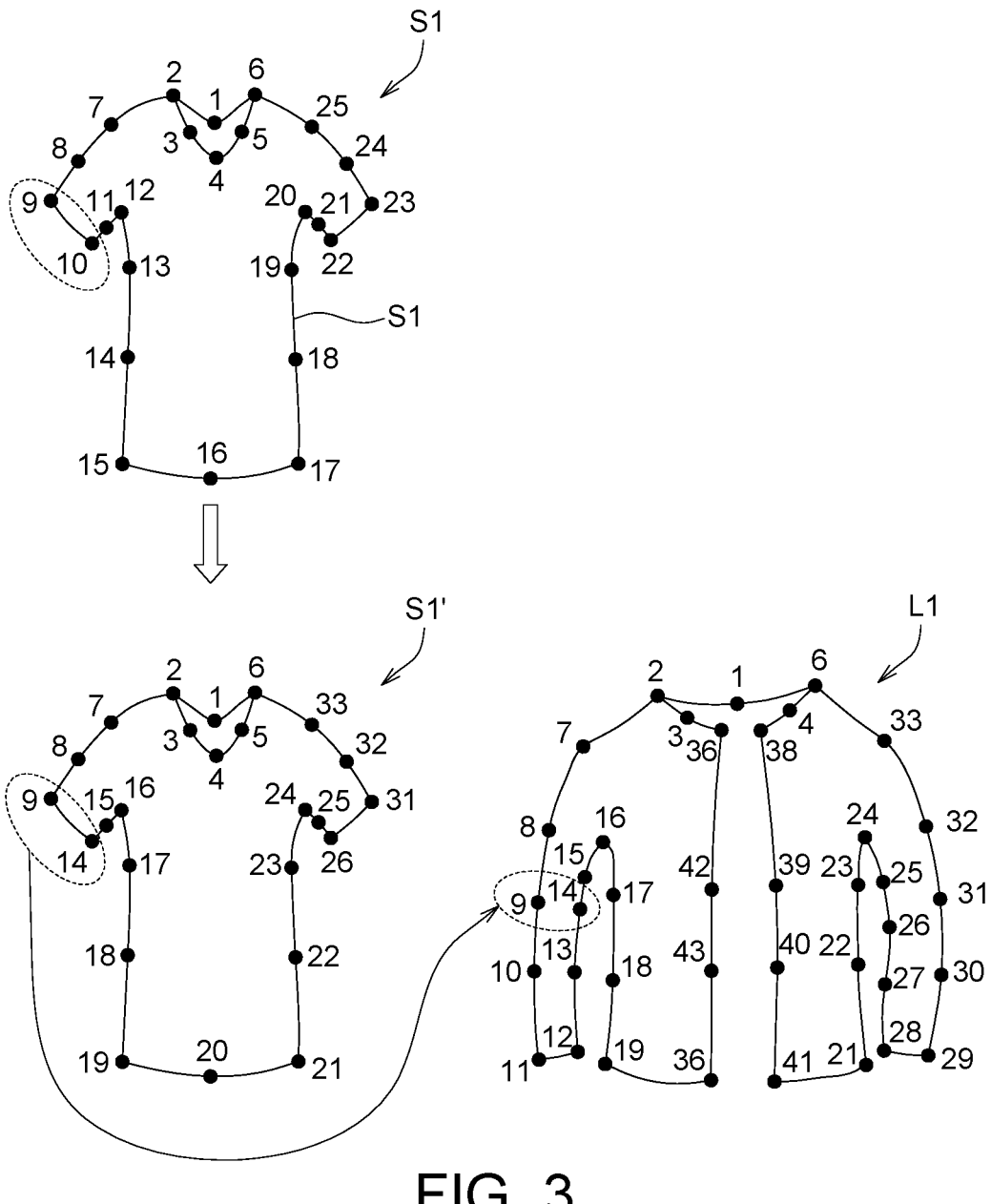
FIG. 3 is a detailed illustration about the feature extraction in the measuring method for body-shaped data.

In step S110, perform the feature extraction on the apparel image to obtain a plurality of apparel feature points by the feature positioning module 110. Please refer to FIG. 3, which shows a detailed illustration about the feature extraction in the measuring method for body-shaped data. In step S110, the number of apparel feature points may be rearranged by the feature positioning module 110. In detail, as shown in FIG. 3, in an embodiment, the feature positioning module 110 extracts a feature point pattern S1 from a first type of apparel image, such as a short-sleeved apparel image, according to the feature point positioning technology. The initial reference numbers corresponding to the cuff of the feature point pattern S1 are 9 and 10 for example. The feature positioning module 110 extracts a feature point pattern L1 from a second type of apparel image, such as a long-sleeved apparel image, according to the feature point positioning technology. The initial reference numbers of the feature point pattern L1 corresponding to the position of the cuff of the short-sleeved style are 9 and 14 for example. For different types of apparel image, the initial reference number of the corresponding position may be inconsistent. In an embodiment, refer the first type of apparel image to the second type of apparel image, and rearrange the reference number of the apparel feature point of the feature point pattern S1 to correspond with that of the feature point pattern L1, so that the reference numbers 9 and 10 are rearranged as 9 and 14. The rest of the apparel feature points in the feature point pattern S1 are also rearranged by referring the feature point pattern L1, thereby generating a rearranged feature point pattern S1'. In an embodiment, a garment which is used as the reference for the feature point rearrangement may be a garment with the largest number of apparel feature points. For example, among a long-sleeved top, a short-sleeved top and a sleeveless top, the long-sleeved top has the largest number of apparel feature points, so the reference number of apparel feature points of the long-sleeved top may be taken as a reference for the short-sleeved top and the sleeveless top. Thus, for different types of apparel image, the reference number of the apparel feature points at corresponding positions may be made the same or corresponding to one another, so that the reference numbers are consistent.

Figure 4:
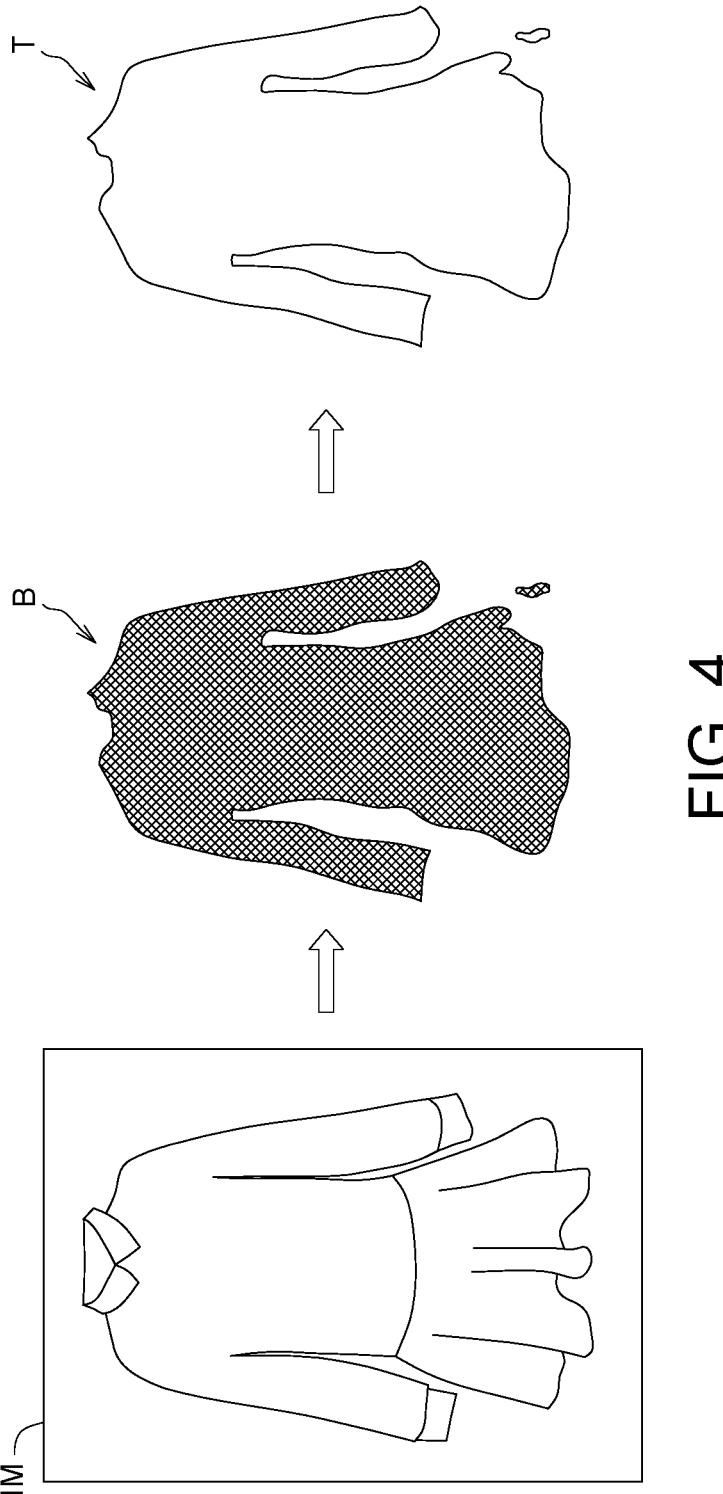
FIG. 4 is a detailed illustration about the contour extraction in the measuring method for body-shaped data.

In step S120, perform the contour extraction on the apparel image to obtain the apparel boundary by the image segmentation module 120. Please refer to FIG. 4, which shows a detailed illustration about the contour extraction of the apparel image. In step S120, as shown in FIG. 4, the image segmentation module 120 may use the technology of Mask R-CNN to perform the image matting on the apparel image IM to remove its background, output the background removal result B, and then obtain the boundary coordinates of the apparel boundary T according to the background removal result B. As such, the contour extraction is completed.

In step S130, calculate at least one shift value of the apparel feature points relative to the apparel boundary based on the apparel feature points and the apparel boundary by the processing module 130. Next, in step S140, correct at least one of the apparel feature points according to the at least one shift value by the processing module 130. Please refer to FIG. 5, which shows the detailed illustration about the calculation and correction of the shift value.

Figure 5:
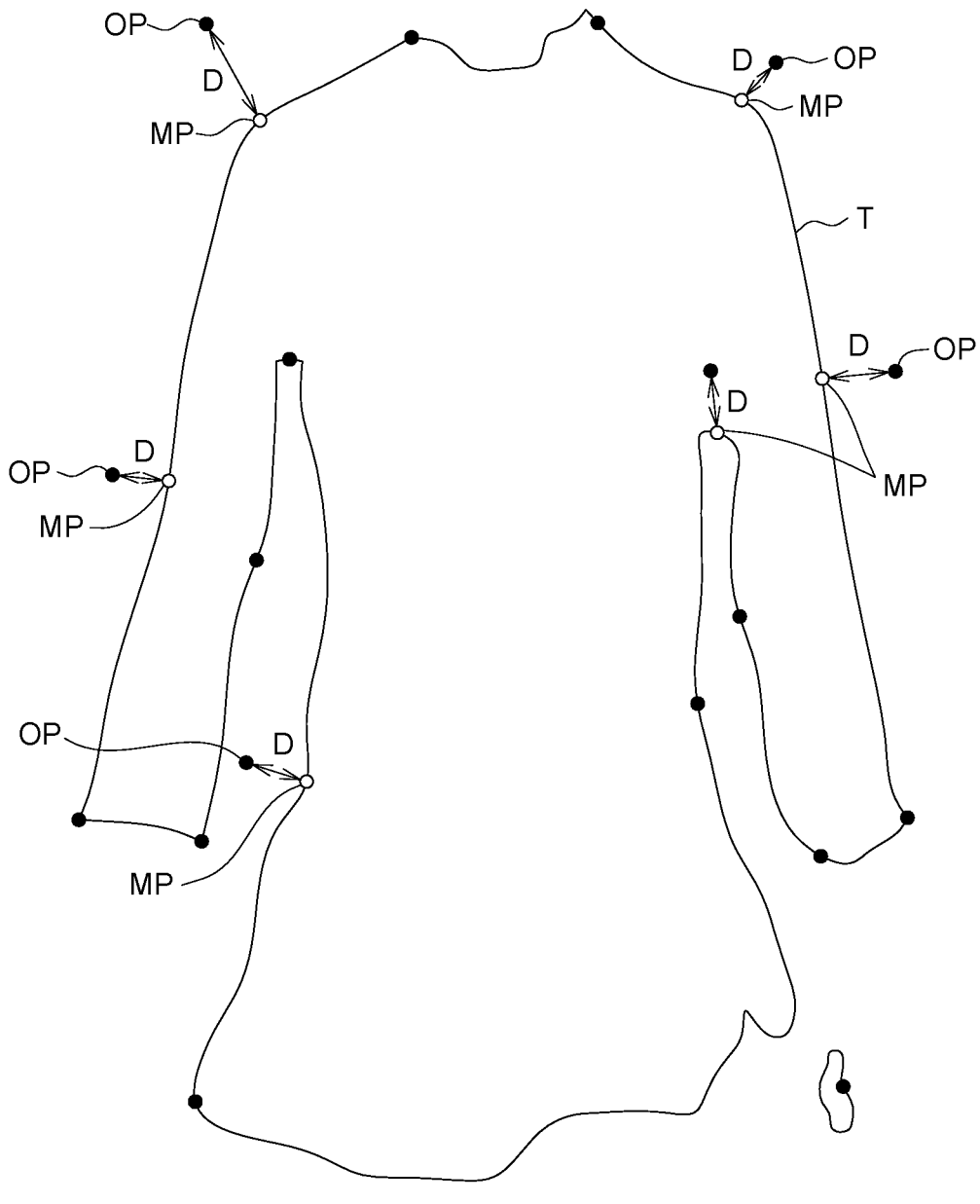
FIG. 5 is a detailed illustration about the calculation and correction of shift value in the measuring method for body-shaped data.

In step S130, the processing module 130 may be configured to calculate a shortest distance between an original position of each of the apparel feature points and the apparel boundary, and take the shortest distance as the shift value. In detail, as shown in FIG. 5, after the apparel boundary T is obtained according to the background removal result B, the apparel feature points extracted from the apparel image IM are marked on the contour figure of the apparel boundary T, wherein there may be a deviation between some or all of the apparel feature points and the apparel boundary T. That is, some or all of the apparel feature points are not accurately located on the apparel boundary T. In an embodiment, some of the apparel feature points deviate from the apparel boundary T, and the rest of the apparel feature points are accurately located on the apparel boundary T. The processing module 130 is configured to calculate a shortest distance D between an original position OP of the apparel feature point and the apparel boundary T, and the shortest distance D may be taken as the shift value. In an embodiment, the apparel feature points whose shift value is not zero need to be corrected, and the apparel feature points whose shift value is zero need not be corrected. In an embodiment, a calculation for the shortest distance D is to calculate the distance between the original position OP and an intersection point formed by the original position OP extending along a vertical direction of the apparel boundary T and intersecting with the apparel boundary T. In an embodiment, a calculation for the shortest distance D is to calculate the distances between the original position OP and all the coordinate points of the apparel boundary T and take a minimum value as the shortest distance.

In step S140, the processing module 130 may be configured to correct the apparel feature points respectively to be displaced from an original position of the apparel feature points by the shortest distance to a corrected position on the apparel boundary. In detail, as shown in FIG. 5, the corrected position MP on the contour of the apparel boundary T may be calculated by the processing module 130 according to the original position OP and the shortest distance D, so as to correct some of the apparel feature points with deviation to be displaced from the original position OP by the shortest distance to the corrected position MP on the apparel boundary T. As such, the correction of the shift value is completed. In an embodiment, the apparel feature points may be corrected by the processing module 130 to be displaced from the original position OP to the intersection point formed by the original position OP extending along a vertical direction to the apparel boundary T and intersecting with the apparel boundary T, thereby making the subsequent body-shaped data measurement more accurate.

Figure 6:
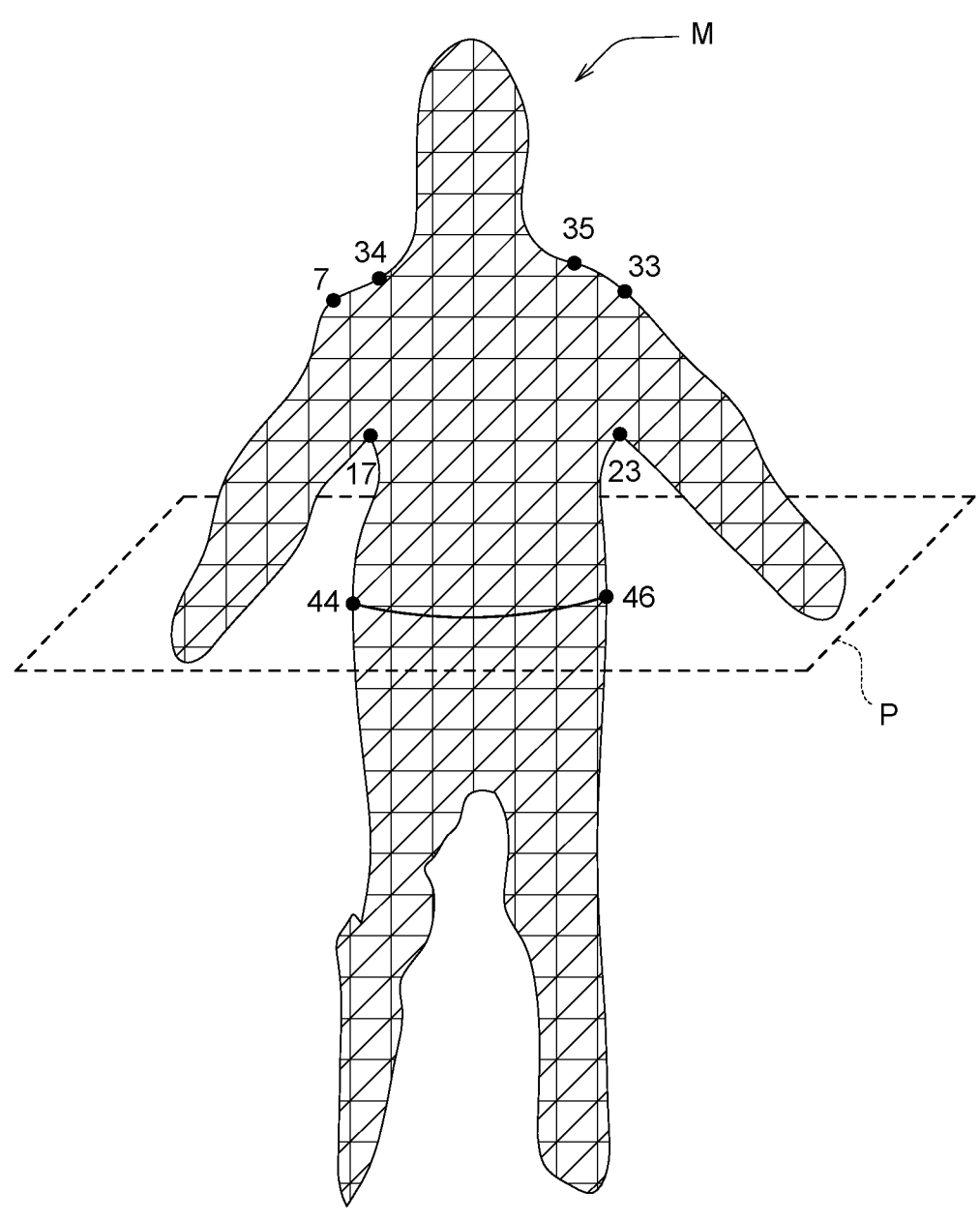
FIG. 6 is a detailed illustration about the projection of apparel feature points in the measuring method for body-shaped data.

In step S150, at least one of the corrected apparel feature points may be projected to the three-dimensional model by the processing module 130. In an embodiment, the apparel feature points that have been corrected in step S140 and/or the rest that need not be corrected are projected to the three-dimensional model and obtain at least one body-shaped data according to the apparel feature points in the three-dimensional model to . . . For example, if all the apparel feature points need to be corrected, all the corrected apparel feature points are projected to the three-dimensional model. For another example, if part of the apparel feature points need to be corrected, and the rest need not be corrected, said corrected part of the apparel feature points and the uncorrected rest of apparel feature points are projected to the three-dimensional model. In an embodiment, the three-dimensional model is a three-dimensional mesh model for example. Please refer to FIG. 6, which shows a detailed illustration about the projection of apparel feature points. In detail, as shown in FIG. 6, the apparel feature points (as shown in reference no. 7, 17, 23, 33, 34, 35, 44 and 46) after corrected with the shift value may be used by Raycast technology to be projected to the three-dimensional mesh model M, and then the body-shaped data is obtained according to these apparel feature points in the three-dimensional mesh model M. Specifically, the body-shaped data may include length and/or width information, such as a shoulder width, a sleeve length, garment length, a trouser length, a hip width and/or a skirt length, etc. The step S150 may comprises calculating the distance between two of apparel features by the processing module 130 to obtain the body-shaped data. For example, a shoulder width may be obtained by calculating the distance between two apparel feature points, such as reference no. 7 and no. 33, in the three-dimensional mesh model M by the processing module 130.

In an embodiment, the body-shaped data may also include circumference information, such as a neck circumference, a bust circumference, a waist circumference, a hip circumference and/or a leg circumference. The step S150 may comprises calculating a perimeter length of an intersection plane of the three-dimensional mesh model M where two of the apparel feature points are located to obtain the at least one body-shaped data by the processing module 130. For example, in order to obtain the waist circumference, an average horizontal height of two apparel feature points, such as number 44 and number 46, in the three-dimensional mesh model M may be calculated by the processing module 130, and generate an intersection plane P on the three-dimensional mesh model M at this average horizontal, and then calculate a perimeter of the closed curve including the reference no. 44 and no. 46 on the intersection plane P of the three-dimensional mesh model M. Regarding aspect of application, the obtained body-shaped data may be transmitted to a remote server of an ecommerce website by wired or wireless network communication, for the remote server to access and use. For example, when a user surfs this ecommerce website, the remote server is able to recommend the size of a garment to the user on this ecommerce website according to the received body-shaped data.

In conclusion, the measuring method and system for body-shaped data provided in the disclosure of the present invention are able to extract multiple apparel feature points and an apparel boundary from an apparel image, perform a shift correction on the apparel feature points relative to the apparel boundary, and then project the corrected apparel feature points to a three-dimensional model, so as to obtain at least one body-shaped data according to the apparel feature points in the three-dimensional model. Therefore, an accurate body shape measurement result may be obtained based on the apparel image.

While the disclosure of the present invention has been described and illustrated with reference to specific embodiments thereof, these descriptions and illustrations do not limit the present invention. It should be understood by those skilled in the art that various changes may be made and equivalents may be substituted without departing from the true spirit and scope of the present invention as defined by the appended claims.

What is claimed is:

1. A measuring method for body-shaped data, comprising:
performing, by a feature positioning module, a feature extraction on an apparel image to obtain a plurality of apparel feature points of the apparel image;
performing, by an image segmentation module, a contour extraction on the apparel image to obtain an apparel boundary of the apparel image, further comprising:
performing, by the feature positioning module, the feature extraction on a first type of apparel image and a second type of apparel image to obtain the apparel feature points corresponding to the first type of apparel image and the apparel feature points corresponding to the second type of apparel image; and
referring the first type of apparel image to the second type of apparel image, and rearranging the reference number of the apparel feature points of the first type of apparel image;
calculating, by a processing module, at least one shift value of the apparel feature points of the apparel image relative to the apparel boundary of the apparel image based on the apparel feature points of the apparel image and the apparel boundary of the apparel image;
correcting, by the processing module, at least one of the apparel feature points of the apparel image according to the at least one shift value; and
projecting, by the processing module, the corrected at least one of the apparel feature points of the apparel image to a three-dimensional model, and obtaining at least one body-shaped data according to the apparel feature points of the apparel image on the three-dimensional model.

2. The measuring method for body-shaped data according to claim 1, wherein calculating the at least one shift value of the apparel feature points of the apparel image relative to the apparel boundary of the apparel image based on the apparel feature points of the apparel image and the apparel boundary of the apparel image further comprises:
calculating, by the processing module, a shortest distance between an original position of each of the apparel feature points of the apparel image and the apparel boundary of the apparel image and taking the shortest distance as the at least one shift value.

3. The measuring method for body-shaped data according to claim 2, wherein correcting at least one of the apparel feature points of the apparel image according to the at least one shift value comprising:
correcting, by the processing module, the apparel feature points of the apparel image respectively to be displaced from an original position of the apparel feature points of the apparel image by the shortest distance to a corrected position on the apparel boundary of the apparel image.

4. The measuring method for body-shaped data according to claim 2, wherein the apparel feature point(s) of the apparel image whose shift value is zero is/are not be corrected, and projecting the corrected at least one of the apparel feature points of the apparel image to the three-dimensional model and obtaining at least one body-shaped data according to the apparel feature points of the apparel image on the three-dimensional model comprise:
projecting the corrected at least one of the apparel feature points of the apparel image and the uncorrected apparel feature point(s) of the apparel image to the three-dimensional model.

5. The measuring method for body-shaped data according to claim 4, wherein projecting the corrected at least one of the apparel feature points of the apparel image to the three-dimensional model and obtaining at least one body-shaped data according to the apparel feature points of the apparel image on the three-dimensional model further comprise:
calculating, by the processing module, a distance between two of the apparel feature points of the apparel image in the three-dimensional model to obtain the at least one body-shaped data.

6. The measuring method for body-shaped data according to claim 5, wherein the at least one body-shaped data includes a shoulder width, a sleeve length, a garment length, a trouser length, a hip width or a skirt length.

7. The measuring method for body-shaped data according to claim 1, wherein projecting the corrected at least one of the apparel feature points of the apparel image to the three-dimensional model and obtaining at least one body-shaped data according to the apparel feature points of the apparel image on the three-dimensional model further comprise:
calculating, by the processing module, a perimeter length of an intersection plane of the three-dimensional model where two of the apparel feature points of the apparel image are located to obtain the at least one body-shaped data.

8. The measuring method for body-shaped data according to claim 1, wherein the apparel image on which the image segmentation module performs the contour extraction is a two-dimensional image.

9. The measuring method for body-shaped data according to claim 1, wherein the apparel image is an image showing that a garment worn on a human body.

10. A measuring system for body-shaped data, comprising:
a feature positioning module, configured to perform an feature extraction on an apparel image to obtain a plurality of apparel feature points of the apparel image, wherein the feature positioning module is further configured to:
perform the feature extraction on a first type of apparel image and a second type of apparel image to obtain the apparel feature points corresponding to the first type of apparel image and the apparel feature points corresponding to the second type of apparel image; and
refer the first type of apparel image to the second type of apparel image and rearrange the reference number of the apparel feature points of the first type of apparel image;
an image segmentation module, configured to perform a contour extraction on the apparel image to obtain an apparel boundary of the apparel images; and a processing module, configured to:

calculate at least one shift value of the apparel feature points of the apparel image relative to the apparel boundary of the apparel image based on the apparel feature points of the apparel image and the apparel boundary of the apparel image, correct at least one of the apparel feature points of the apparel image according to the at least one shift value, and project the corrected at least one of the apparel feature points of the apparel image to a three-dimensional model and obtain at least one body-shaped data according to the apparel feature points of the apparel image on the three-dimensional model.

11. The measuring system for body-shaped data according to claim 10, wherein the processing module is configured to calculate a shortest distance between an original position of each of the apparel feature points of the apparel image and the apparel boundary of the apparel image and taking the shortest distance as the at least one shift value.

12. The measuring system for body-shaped data according to claim 11, wherein the processing module is configured to correct the apparel feature points of the apparel image respectively to be displaced from an original position of the apparel feature points of the apparel image by the shortest distance to a corrected position on the apparel boundary of the apparel image.

13. The measuring system for body-shaped data according to claim 11, wherein the processing module does not correct the apparel feature point(s) of the apparel image whose shift value is zero, the processing module is configured to project the corrected at least one of the apparel feature points of the apparel image and the uncorrected apparel feature point(s) of the apparel image to the three-dimensional model.

14. The measuring system for body-shaped data according to claim 10, wherein the processing module is configured to calculate a distance between two of the apparel feature points of the apparel image in the three-dimensional model to obtain the at least one body-shaped data.

15. The measuring system for body-shaped data according to claim 14, wherein the at least one body-shaped data includes a shoulder width, a sleeve length, a garment length, a trouser length, a hip width or a skirt length.

16. The measuring system for body-shaped data according to claim 10, wherein the processing module is configured to calculate a perimeter length of an intersection plane of the three-dimensional model where two of the apparel feature points of the apparel image are located to obtain the at least one body-shaped data.

17. The measuring system for body-shaped data according to claim 10, wherein the apparel image on which the image segmentation module performs the contour extraction is a two-dimensional image.

18. The measuring system for body-shaped data according to claim 10, wherein the apparel image is an image showing that a garment worn on a human body.

\*   \*   \*   \*   \*